United States Patent [19]

Yoshitsugu

[11] Patent Number: 4,711,468
[45] Date of Patent: Dec. 8, 1987

[54] GUIDE RAIL FOR SEAT BELT DEVICE

[75] Inventor: Noritada Yoshitsugu, Toyota, Japan

[73] Assignee: Toyota Jidosha Kabushiki Kaisha, Aichi, Japan

[21] Appl. No.: 874,646

[22] Filed: Jun. 16, 1986

[30] Foreign Application Priority Data

Jun. 21, 1985 [JP] Japan .................. 60-94333[U]

[51] Int. Cl.$^4$ .................................. B60R 21/10
[52] U.S. Cl. .................................. 280/804
[58] Field of Search .................. 280/802, 804

[56] References Cited

U.S. PATENT DOCUMENTS 4,286,804  9/1981  Maekawa et al. ............ 280/804
4,343,489  8/1982  Suzuki et al. ................ 280/804
4,437,683  3/1984  Moriya et al. ................ 280/804

FOREIGN PATENT DOCUMENTS 140252  8/1982  Japan ............................. 280/804
 56946  4/1983  Japan ............................. 280/804

Primary Examiner—John J. Love
Assistant Examiner—Ross Weaver
Attorney, Agent, or Firm—Parkhurst & Oliff

[57] ABSTRACT

A guide rail for a seat belt device comprising a slider slidably movably provided in a slot of the guide rail installed on a roof side and a webbing mounted at the end thereof on the slider for restricting an occupant, and the guide rail is so installed on the roof side that the slot of said guide rail is inclined toward the outside of a compartment from the extending direction of the roof side. Thus, the guide rail can reduce the possibility of the webbing to contact an occupant's face even when the slider passes the guide rail of a roof side.

3 Claims, 5 Drawing Figures

GUIDE RAIL FOR SEAT BELT DEVICE

BACKGROUND OF THE INVENTION

The present invention relates to an installation structure of a movable guide rail in which a webbing for restricting an occupant is mounted at the end in a seat belt device.

A seat belt device protects an occupant by restricting the occupant by a webbing at an emergency time. However, the webbing for restricting an occupant generally has a very low mounting rate due to a complicated construction. Thus, various seat belt devices which can automatically mount a webbing on an occupant's body after the occupant sits on a seat have been heretofore proposed. One of the conventional seat belt devices mounts a guide rail on an automotive body, and slidably moves a slider at which the end of a webbing is mounted along the guide rail to thus automatically mount and dismount the webbing on an occupant by detachably contacting the webbing on the occupant sitting on a seat. This conventional example will be described in detail with respect to FIGS. 3 and 4. As shown in FIG. 3, a guide rail 1 is installed not only on a roof side 2 but also over a front pillar 3 and a center pillar 4. A slider 5 is held at one end in the guide rail 1 to allow the slider 5 to be movable. One end of a webbing 6 mounted at the slider 5 as the end in a compartment of a vehicle is wound in a winding unit 7 mounted on a floor in the compartment. The other end of the webbing 6 as the end out of the compartment is mounted on the slider 5. The slider 5 is automatically slidably moved. The slider 5 is automatically moved by a drive tape 8 contained in the guide rail 1. The drive tape 8 is reciprocated by a tape drive unit 9.

The guide rail shown in FIG. 3 will be illustrated in the cross section taken along the line IV—IV in FIG. 5 and will be described in more detail. The guide rail 1 is molded by an extrusion molding, and fastened by bolt and nut 13 to a roof side opening flange 12. The flange 12 designates an edge formed by bonding a roof side outer panel 12A and a roof side inner panel 12B for forming the roof side 2. A ceiling member 14 is provided at the guide rail 1 inside the compartment, and a roof side garnish 15 covers the edge of the member 14 and the guide rail 1. The inner end of the slider 5 in the guide rail 1 is formed in T shape, and a T-shaped slot 16 is formed in the guide rail 1 to hold the T-shaped end. A drive tape slot 17 for reciprocating the tape 8 is further formed in the guide rail 1, and the tape 8 is contained in the slot 17. A shoulder anchor plate 18 is engaged by an anchor bolt 19 with the other end of the slider 5, and the webbing 6 is mounted on the anchor plate 18. A shoulder anchor cover 20 is provided to cover the periphery of the anchor plate 18. The end of the flange 12 is covered by an opening trim 21 made of resin.

In this conventional art as described above, the webbing 6 mounted on the slider 5 might contact the face of an occupant 22 when the slider 5 passes the roof side (FIG. 4). This is bacause the slider 5 and the webbing 6 of the portion mounted at the slider 5 are disposed inside the compartment.

SUMMARY OF THE INVENTION

Accordingly, an object of the present invention is to provided a guide rail of a seat belt device which can eliminate the aforementioned drawbacks of the conventional guide rail and can reduce the possibility of a webbing contacting an occupant's face even when a slider passes the guide rail of a roof side.

The guide rail of the seat belt device according to the present invention to obviates the abovementioned drawback by tilting the installing angle of the guide rail. More particularly, the guide rail is tilted by inclining the installing angle of the guide rail 1 in the section of the guide rail. Thus, the direction of the slot of the guide rail 1 for holding the slider 5 is toward the outside of the compartment.

Heretofore, the direction of the slot of the guide rail is directed in parallel with the roof side opening flange 12 (FIG. 5). However, since the guide rail is inclined as described above, according to the present invention, the projecting direction of the slider 5 is more toward the outside of the compartment, as compared with the conventional guide rail. Therefore, the possibility of the webbing 6 contacting the face of the occupant 22 can be reduced.

These and other objects and features will become more apparent from the following description of the preferred embodiments of the present invention when read in connection with the accompanying drawings.

DESCRIPTION OF THE PREFERRED EMBODIMENTS

Figure 1:
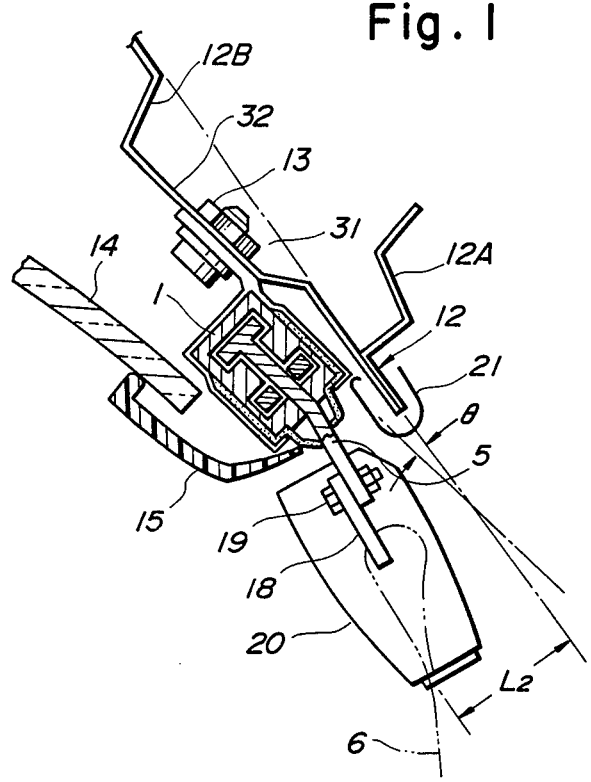
FIG. 1 is a cross-sectional view of an embodiment of a guide rail for a seat belt device according to the present invention.
Figure 2:
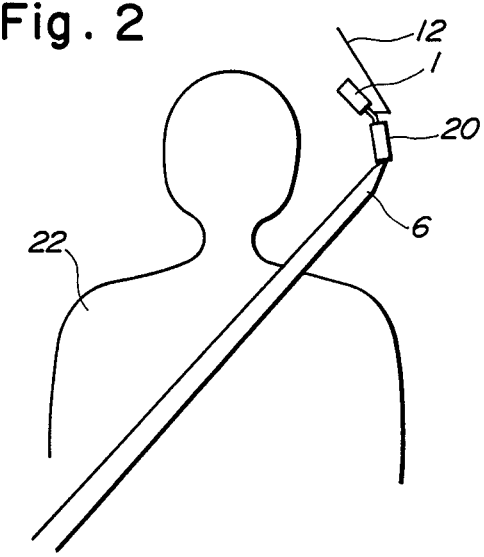
FIG. 2 is a schematic front view of the embodiment of the invention.
Figure 3:
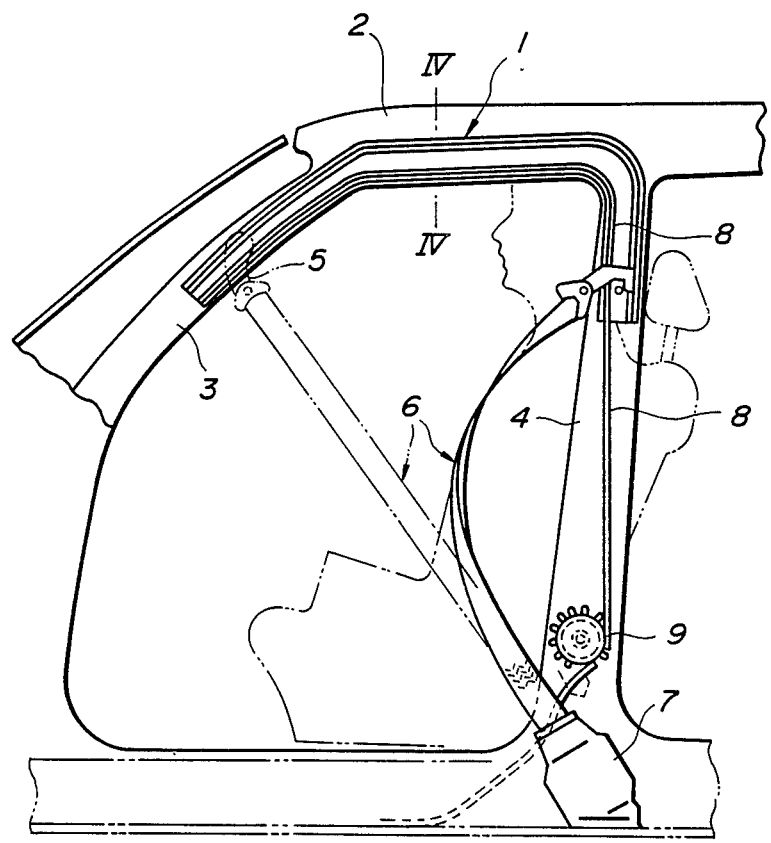
FIG. 3 is a side view of the entire conventional seat belt device.
Figure 4:
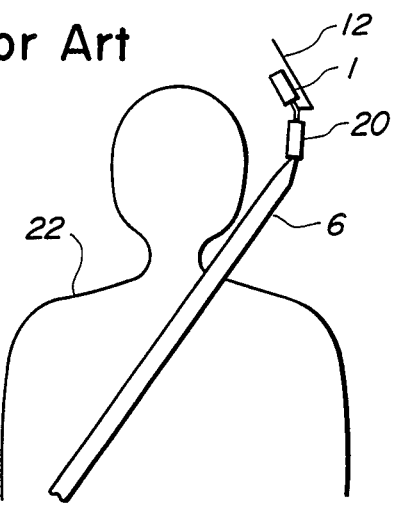
FIG. 4 is a schematic front view of FIG. 3.
Figure 5:
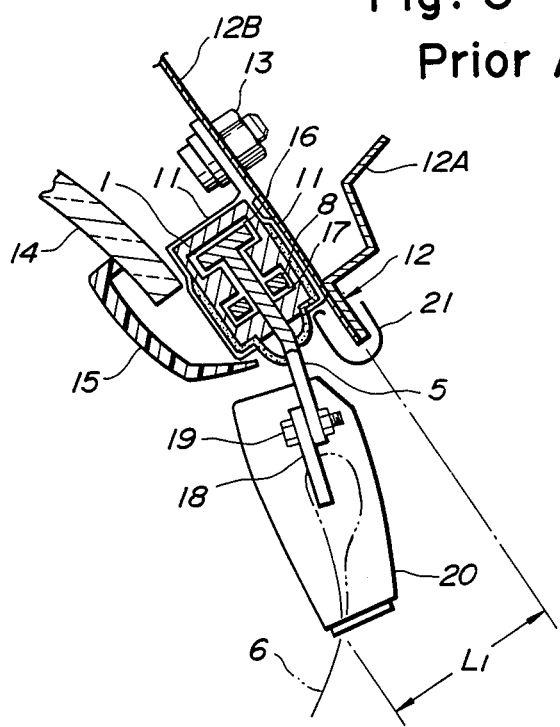
FIG. 5 is a cross-sectional view taken along the line IV—IV in FIG. 3.

An embodiment of a guide rail for a seat belt device according to the present invention will be described in more detail with reference to FIG. 1, wherein the same reference numerals as those in the conventional guide rail in FIGS. 3 to 5 designate the same or equivalent components in FIG. 1, and the detailed description thereof will be omitted. When the design of an automotive body is determined, the tilting direction of a roof side opening flange 12 is also decided. Accordingly, in order to dispose the projecting direction of a slider 5 toward the outside of a compartment of a vehicle, it is necessary to tilt a guide rail 1 for holding the slider 5 with respect to the flange 12. Thus, in this embodment, a recess 31 is formed at the slightly upper portion of a roof side inner panel 12B, and the inclining direction of the bottom 32 of the recess 31 is directed toward the outside of a compartment of a vehicle from the inclining direction of the edge of the flange 12. The guide rail 1 is fastened by bolt and nut 13 to the bottom 32 of the recess 31. Thus, the direction of the slot provided in the guide rail 1 is disposed toward the outside of the compartment at an angle $\theta$ from the inclining direction of the edge of the flange 12, and the projecting direction of the slider 5 held in the slot of the guide rail 1 and projected therefrom can be disposed toward the outside of the compartment in the amount of $L_1-L_2$ as compared with the conventional guide rail. Thus, the possibility of a webbing 6 mounted at the projecting end of the slider 5 to contact the face of an occupant 22 sitting on a seat can be reduced (FIG. 2).

In the embodiment described above, the inclining direction of the bottom 32 of the recess 31 formed at the roof side inner panel 12B coincides with the direction of the slot of the guide rail 1. However, the present invention is not limited to the particular embodiment. For example, in another embodiment of the present invention, the guide rail 1 may be further inclined with respect to the bottom 32 of the recess 21 toward the outside of the compartment of a vehicle. Further, in still another embodiment of the present invention, the recess 31 is not formed, a wedge-shaped spacer (not shown) is interposed at the mounting position of bolt and nut 13 to incline the guide rail 1.

According to the guide rail for the seat belt device in accordance with the present invention as described above, the possibility of the webbing to contact with the face of the occupant can be reduced as compared with the conventional guide rail in which the inclining direction of the edge of the roof side opening flange coincides with the inclining direction of the guide rail.

What is claimed is:

1. A guide rail arrangement for a seat belt device having a slider slidably movably provided in a slot of the guide rail installed on a roof side inner panel, and a webbing mounted at the end thereof on the slider for restricting an occupant, said guide rail comprising:

a recessed portion formed on the roof side inner panel and protruded toward a passenger compartment, a bottom surface of the recessed portion being inclined toward the outside of the passenger compartment at an angle greater than that of the roof side inner panel away from said passenger compartment, the guide being rail secured to the protruded bottom surface of the recessed portion of the roof side inner panel at the side of the passenger compartment, and a groove formed on an inner surface of the guide rail through which the slider moves, said groove being inclined toward the outside of the compartment at an angle at least as great as that of the bottom surface of the recessed portion toward the outside of the compartment.

2. The guide rail according to claim 1, wherein the inclining angle of the bottom of the recessed portion of the inner panel is substantially the same as that of the slot in said guide rail.

3. The guide rail according to claim 1, wherein said guide rail is so mounted to the reccessed portion of the inner panel that the inclining angle of the slot in the guide rail is directed toward the outside of the compartment with respect to the inclining angle of the bottom of the reccessed portion of the inner panel.

* * * * *